United States Patent
Chokki et al.

(10) Patent No.: US 8,693,130 B2
(45) Date of Patent: Apr. 8, 2014

(54) MAGNETIC DISK DEVICE AND CONTROL METHOD THEREOF, AND INFORMATION PROCESSOR

(75) Inventors: Kazuo Chokki, Higashiyamoto (JP); Yasushi Ishizuka, Hamura (JP); Satoshi Shibata, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 712 days.

(21) Appl. No.: 12/876,941

(22) Filed: Sep. 7, 2010

(65) Prior Publication Data

US 2011/0188154 A1 Aug. 4, 2011

(30) Foreign Application Priority Data

Jan. 29, 2010 (JP) .................................. 2010-019593

(51) Int. Cl.
*G11B 21/02* (2006.01)
*G11B 27/26* (2006.01)

(52) U.S. Cl.
USPC ............................................... 360/75; 360/31

(58) Field of Classification Search
None
See application file for complete search history.

(56) References Cited

U.S. PATENT DOCUMENTS

| | | | |
|---|---|---|---|
| 6,240,470 B1 | 5/2001 | Murayama et al. | |
| 6,446,199 B1 | 9/2002 | Howe et al. | |
| 6,931,503 B1 * | 8/2005 | Robb et al. | 711/163 |
| 6,996,667 B2 | 2/2006 | Aoki et al. | |

FOREIGN PATENT DOCUMENTS

| | | |
|---|---|---|
| JP | HEI 4-311225 A | 11/1992 |
| JP | 08-328756 | 12/1996 |
| JP | 10-097701 | 4/1998 |
| JP | 11-237957 | 8/1999 |
| JP | 11-238202 | 8/1999 |
| JP | 3415990 B | 4/2003 |
| JP | 2003-303165 | 10/2003 |
| JP | 2004-062663 | 2/2004 |
| JP | 2007-018576 | 1/2007 |
| JP | 2007-293937 A | 11/2007 |

OTHER PUBLICATIONS

Japanese Office Action for corresponding Japanese Application No. 2011-155849, dated May 8, 2012, in 5 pages.
Japanese office action for corresponding Japanese Application No. 2011-155849, mailed Dec. 4, 2012, in 3 pages.

* cited by examiner

*Primary Examiner* — Andrew L Sniezek
(74) *Attorney, Agent, or Firm* — Knobbe, Martens, Olson & Bear LLP

(57) ABSTRACT

According to one embodiment, a magnetic disk device is configured to read data from and write data to a magnetic disk using a magnetic head and provided with a control module that controls initial operation of the magnetic disk device according to initial firmware. The magnetic disk device includes a reader, a retainer, a blocker, and a switch. The reader reads control firmware stored in the magnetic disk. The retainer fixes a servo control amount for the magnetic head after the control firmware is read, and retains the magnetic head at a predetermined position above the magnetic disk. The blocker blocks input of an interrupt signal to the control module. The switch switches the initial firmware to the control firmware after the servo control amount is fixed and the input of an interrupt signal is blocked.

3 Claims, 4 Drawing Sheets

MAGNETIC DISK DEVICE AND CONTROL METHOD THEREOF, AND INFORMATION PROCESSOR

CROSS-REFERENCE TO RELATED APPLICATIONS

This application is based upon and claims the benefit of priority from Japanese Patent Application No. 2010-019593, filed Jan. 29, 2010, the entire contents of which are incorporated herein by reference.

FIELD

Embodiments described herein relate generally to a controller for a magnetic disk device, a magnetic disk device and a control method thereof, and an information processor.

BACKGROUND

There are hard disk drives (HDDs) that store control firmware in a magnetic disk. For example, Japanese Patent No. 3415990 discloses a conventional HDD storage device that has firmware (a first part) on a flash read only memory (ROM). Activating the driving mechanism, the firmware loads data from a spare area of a disk medium into a static random access memory (SRAM). The conventional HDD storage device also has firmware (a second part) that is stored in the spare area of the disk medium and loaded into the SRAM therefrom or that is swapped into or out of the SRAM.

In such an HDD storage device, control firmware used for ordinary operation is stored in the magnetic disk, and is read from the magnetic disk using loader (initial firmware) stored in a nonvolatile memory. After that, firmware to be executed needs to be switched from the initial firmware to the read control firmware. Through conventional technologies, the firmware switch is performed while a magnetic head is once retracted to the ramp, or the firmware is changed (or added) not entirely but partly.

To accelerate the control, it is desirable that the firmware to be executed be switched from the initial firmware to the control firmware while the magnetic head extended to read the control firmware used for ordinary operation is kept above the magnetic disk. However, it is difficult for the conventional HDD storage device to perform such firmware switch. This is because servo control, interrupt control, and the like are generally required while the magnetic head is extended to above the magnetic disk, and part of the firmware always runs for the control operations (running firmware cannot be switched).

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
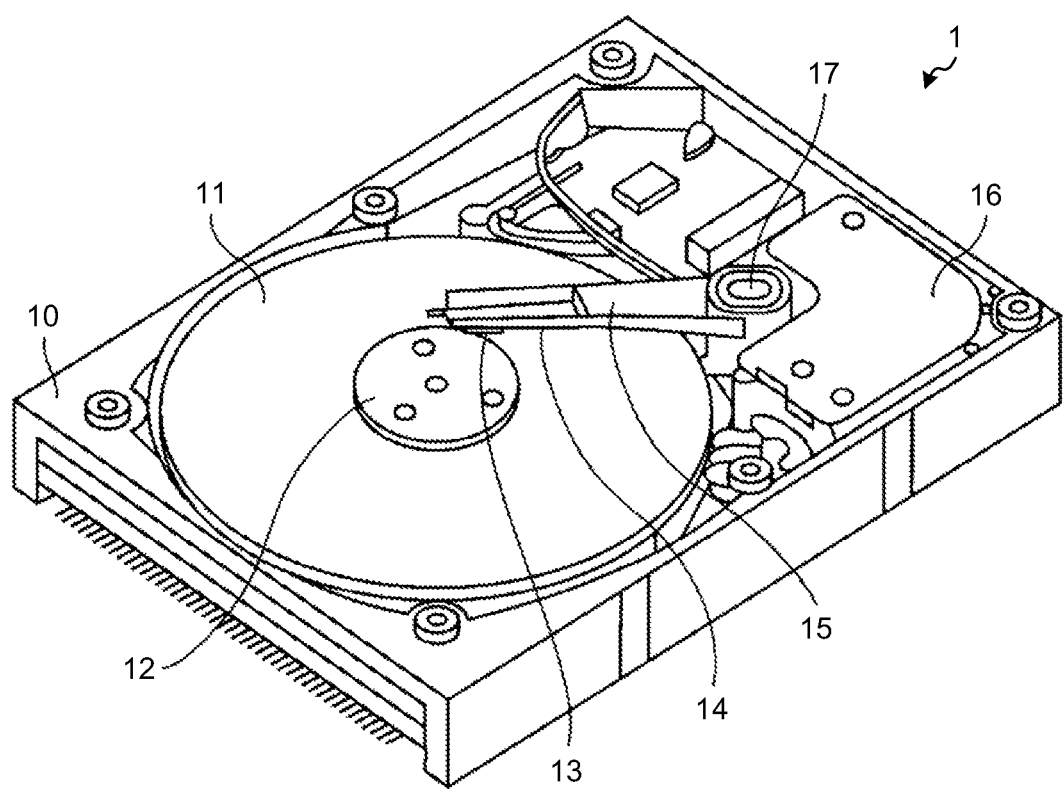
FIG. 1 is an exemplary perspective view of a magnetic disk device according to an embodiment.

Various embodiments will be described hereinafter with reference to the accompanying drawings. In general, according to one embodiment, a controller is provided with a control module that controls initial operation of a magnetic disk device that reads data from and writes data to a magnetic disk using a magnetic head according to initial firmware. The controller comprises a reader, a retainer, a blocker, and a switch. The reader is configured to read control firmware stored in the magnetic disk. The retainer is configured to fix a servo control amount for the magnetic head after the control firmware is read, and retain the magnetic head at a predetermined position above the magnetic disk. The blocker is configured to block input of an interrupt signal to the control module. The switch is configured to switch the initial firmware to the control firmware after the servo control amount is fixed and the input of an interrupt signal is blocked.

According to another embodiment, a magnetic disk device is configured to read data from and write data to a magnetic disk using a magnetic head and is provided with a control module that controls initial operation thereof according to initial firmware. The magnetic disk device comprises a reader, a retainer, a blocker, and a switch. The reader is configured to read control firmware stored in the magnetic disk. The retainer is configured to fix a servo control amount for the magnetic head after the control firmware is read, and retain the magnetic head at a predetermined position above the magnetic disk. The blocker is configured to block input of an interrupt signal to the control module. The switch is configured to switch the initial firmware to the control firmware after the servo control amount is fixed and the input of an interrupt signal is blocked.

According to still another embodiment, a control method applied to a magnetic disk device configured to read data from and write data to a magnetic disk using a magnetic head and provided with a control module that controls initial operation of the magnetic disk device according to initial firmware, comprises: reading control firmware stored in the magnetic disk; fixing a servo control amount for the magnetic head after the control firmware is read, and retaining the magnetic head at a predetermined position above the magnetic disk; blocking input of an interrupt signal to the control module; and switching the initial firmware to the control firmware after the servo control amount is fixed and the input of an interrupt signal is blocked.

According to still another embodiment, an information processor is provided with a control module that controls initial operation of a magnetic disk device that reads data from and writes data to a magnetic disk using a magnetic head according to initial firmware. The information processor comprises a reader, a retainer, a blocker, and a switch. The reader is configured to read control firmware stored in the magnetic disk. The retainer is configured to fix a servo control amount for the magnetic head after the control firmware is read, and retain the magnetic head at a predetermined position above the magnetic disk. The blocker is configured to block input of an interrupt signal to the control module. The switch is configured to switch the initial firmware to the control firmware after the servo control amount is fixed and the input of an interrupt signal is blocked.

Like reference numerals refer to like parts throughout the several views of the drawings.

With reference to FIG. 1, a description will be given of a configuration of a magnetic disk device 1 according to an embodiment. FIG. 1 is a perspective view of the magnetic disk device 1 according to the embodiment.

As illustrated in FIG. 1, similar to commonly known hard disk drives (HDDs), the magnetic disk device 1 comprises a housing 10 that houses a magnetic disk 11, a spindle motor 12, a head slider 13, a suspension 14, and an actuator arm 15. The spindle motor rotates the magnetic disk 11. The head slider 13 is provided with a built-in magnetic head (not illustrated in FIG. 1). The magnetic disk device 1 further comprises ahead suspension assembly and a voice coil motor (VCM) 16. The head suspension assembly supports the head slider 13. The VCM 16 is an actuator for the head suspension assembly.

The magnetic disk 11 is rotated by the spindle motor 12. The head slider 13 is provided with the magnetic head including a write head and a read head (none of them illustrated in FIG. 1). The actuator arm 15 is pivotally attached to a pivot 17, and the suspension 14 is attached to an end of the actuator arm 15. The head slider 13 is resiliently supported via a gimbal provided to the suspension 14. The VCM 16 is provided to the other end of the actuator arm 15. The VCM 16 rotates the actuator arm 15 about the pivot 17 to position the magnetic head so that the magnetic head floats above a radial position of the magnetic disk 11.

Figure 2:
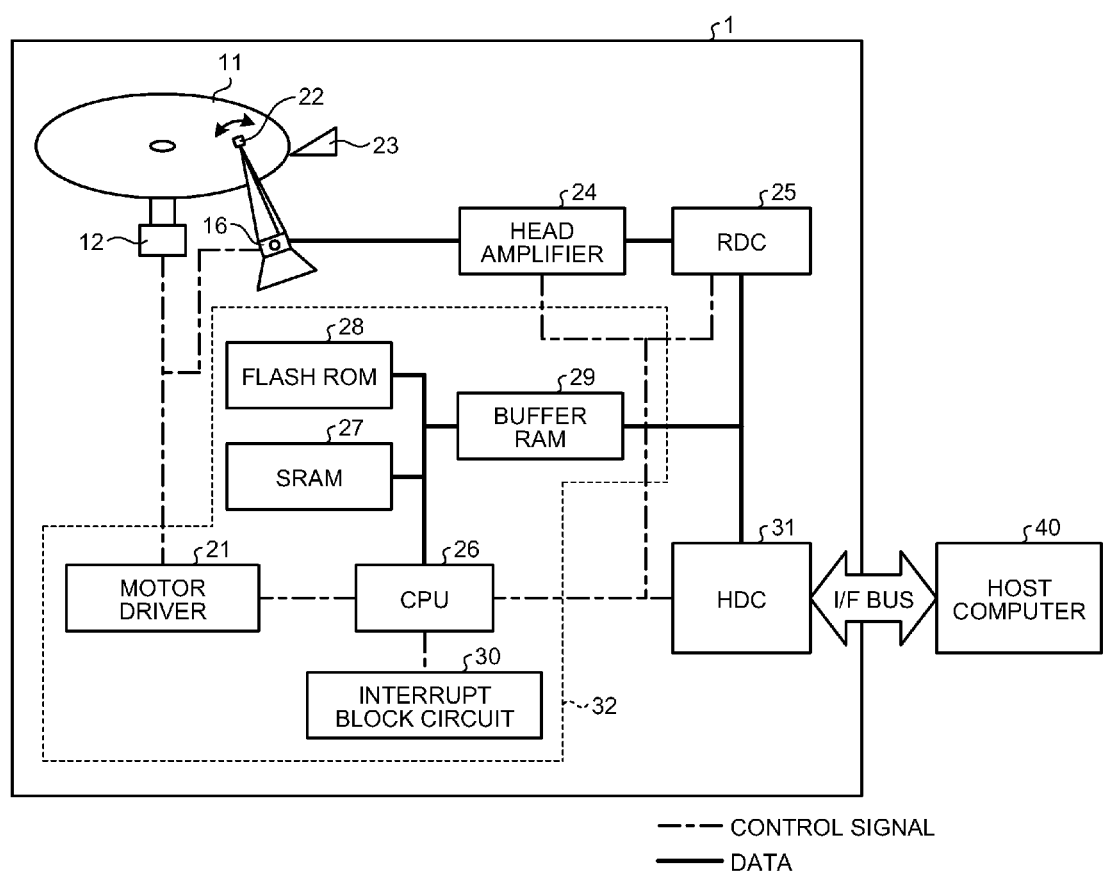
FIG. 2 is an exemplary functional block diagram of an electric hardware configuration of the magnetic disk device in the embodiment.

With reference to FIG. 2, a description will be given of an electric hardware configuration of the magnetic disk device 1 in the embodiment. FIG. 2 is a functional block diagram of an electric hardware configuration of the magnetic disk device 1.

In FIG. 2, the magnetic disk 11 is rotated by the spindle motor 12 (see FIG. 1) about the rotation axis at a predetermined rotational speed. The rotation of the spindle motor 12 is driven by a motor driver 21.

A magnetic head 22 includes a write head and a read head. Using the write head and the read head, the magnetic head 22 writes data to and reads data from the magnetic disk 11. As described above, the magnetic head 22 is located at an end of the actuator arm 15 and is moved in the radial direction of the magnetic disk 11 by the VCM 16 driven by the motor driver 21. When the magnetic disk 11 is not rotating, the magnetic head 22 is retracted on a ramp 23.

A head amplifier 24 amplifies a signal read by the magnetic head 22 from the magnetic disk 11 and outputs it to a read write channel (RDC) 25. The head amplifier 24 also amplifies a signal received from the RDC 25 to write data to the magnetic disk 11 and feeds it to the magnetic head 22.

The RDC 25 code-modulates data to be written to the magnetic disk 11 received from a hard disk controller (HDC) 31, which will be described later, and feeds it to the head amplifier 24. The RDC 25 also code-modulates a signal read from the magnetic disk 11 and received from the head amplifier 24 and outputs it as digital data.

A central processing unit (CPU) 26 is connected to a static random access memory (SRAM) 27 as a working memory, a flash read only memory (ROM) 28 as a nonvolatile memory, and a buffer RAM 29 as a temporary storage. The CPU 26 controls the overall operation of the magnetic disk device 1 according to firmware (initial firmware and control firmware used for ordinary operation) stored in advance in the flash ROM 28 and the magnetic disk 11. The initial firmware executed first upon activation is stored in the flash ROM 28. Meanwhile, the control firmware used for ordinary operation is stored in the magnetic disk 11. Under control of the initial firmware, the control firmware is read from the magnetic disk 11 and once stored in the buffer RAM 29, and then stored in the SRAM 27. An interrupt block circuit 30 blocks input of an interrupt signal to the CPU 26 under the control of the CPU 26. While the motor driver 21, the CPU 26, the SRAM 27, the flash ROM 28, the buffer RAM 29, and the interrupt block circuit 30 constitute a controller 32 that controls the magnetic disk device 1 in the embodiment, it is not so limited.

The HDC 31 controls data communication with a host computer via an interface (I/F) bus, controls the buffer RAM 29, and corrects an error in recorded data. The buffer RAM 29 is used to cache data communicated with a host computer 40 and to temporarily store data read from or to be written to the magnetic disk 11, the control firmware read from the magnetic disk 11, and the like. The magnetic disk device 1 is built in or externally connected to the host computer 40.

Figure 3:
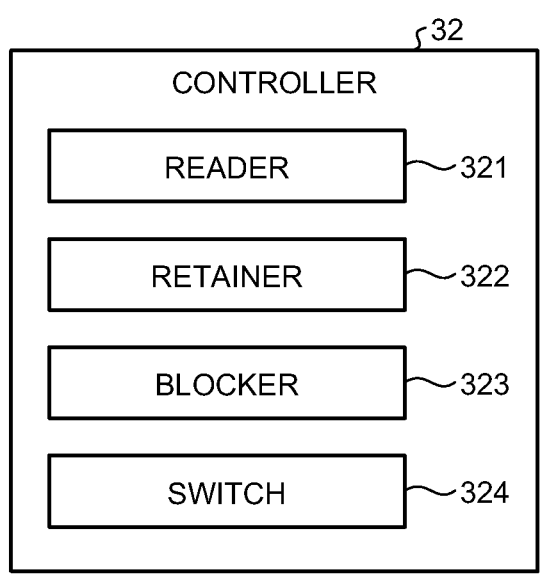
FIG. 3 is an exemplary functional block diagram of a controller of the magnetic disk device in the embodiment.
Figure 4:
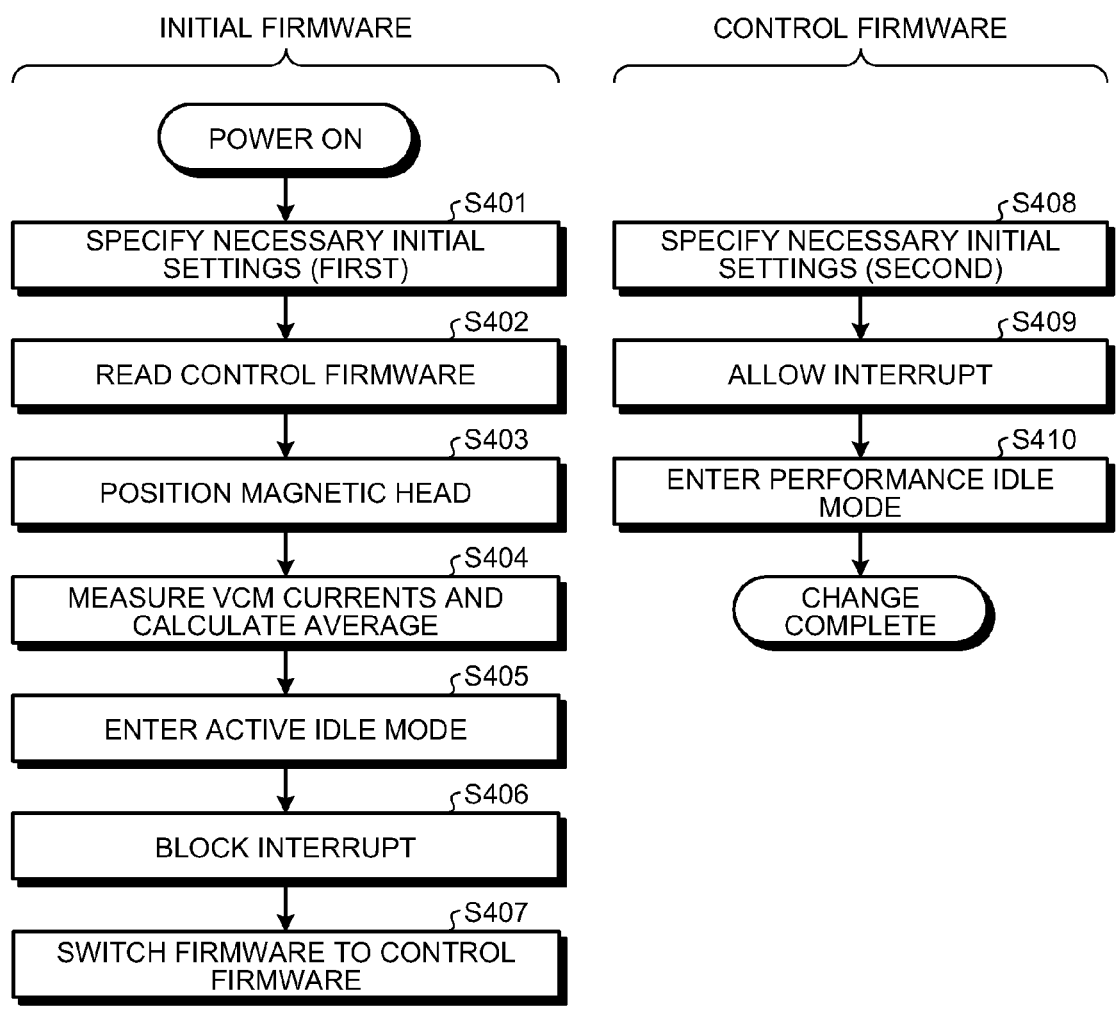
FIG. 4 is an exemplary flowchart of the operation of the controller of the magnetic disk device in the embodiment.

As illustrated in FIG. 3, the controller 32 of the magnetic disk device 1 comprises a reader 321, a retainer 322, a blocker 323, and a switch 324, which are implemented by the CPU 26 operating under the initial firmware. With reference to FIG. 4, a description will be given of the salient feature of the operation of the controller 32 according to the embodiment. FIG. 4 is a flowchart of the operation of the controller 32 of the magnetic disk device 1 according to the embodiment.

When the power is turned on (upon activation), the CPU 26 loads the initial firmware from the flash ROM 28 into the SRAM 27 as a working memory and executes it to specify necessary initial settings (S401). The CPU 26 reads the control firmware used for ordinary operation from the magnetic disk 11 and once stores it in the buffer RAM 29 (S402).

Under control of the initial firmware, the CPU 26 positions the magnetic head 22 extended to above the magnetic disk 11 to read the control firmware at S402 at a predetermined position above the magnetic disk 11 so that the magnetic head 22 is on track (S403). In the embodiment, the magnetic head 22 is positioned at a middle circumference of the magnetic disk 11 (or around the middle circumference).

Under control of the initial firmware, the CPU 26 measures the VCM currents for one rotation along the middle circumference, and calculates the average of the measurement results (S404).

Under control of the initial firmware, the CPU 26 outputs the calculated average value to the VCM 16 to stop servo control (fix the amount of servo control), and enters active idle mode (S405). At this point, the magnetic head 22 is not located on the ramp 23 but retained above the middle circumference of the magnetic disk 11.

Then, under control of the initial firmware, the CPU 26 blocks an interrupt to the CPU (S406).

Thereafter, under control of the initial firmware, the CPU 26 transfers the control firmware stored in the buffer RAM 29 at S402 to the SRAM 27 as a working memory. Accordingly, the initial firmware is overwritten with the control firmware. With this, the firmware executed by the CPU 26 is switched from the initial firmware to the control firmware (S407). After that, the CPU 26 performs the control according to the control firmware.

The CPU 26 specifies necessary initial settings according to the control firmware used for ordinary operation (S408).

Next, the CPU 26 allows interruption according to the control firmware (S409).

The CPU 26 then starts the ordinary operation (performance idle) according to the control firmware (S410). At this point, the magnetic head 22 is located on the magnetic disk 11, particularly, on the middle circumference. Therefore, data read/write operation can be restarted faster compared to the case where the magnetic head 22 is retracted on the ramp 23.

As described above, according to the embodiment, in the active idle mode where the amount of servo control is fixed, the magnetic head 22 is maintained floating in a range (the middle circumference in the above description) above the magnetic disk 11. During that time, an interrupt to the CPU 26 is blocked and the firmware is switched or changed. After the change of the firmware, servo control and the like are restarted. Thus, the entire firmware can be changed at once.

According to the embodiment, the firmware to be executed by the CPU 26 is changed while the magnetic head 22 is maintained above the magnetic disk 11 (particularly, on the middle circumference or around the middle circumference). Thus, the processing time can be reduced compared to the conventional method in which the firmware is changed after the magnetic head is retracted on the ramp. Besides, comparing to the method in which the firmware is partly changed (added) without retracting the magnetic head onto the ramp, since the entire firmware can be changed at once, no problem is caused about matching between parts of the firmware after the change.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A control method applied to a magnetic disk device configured to read data from a magnetic disk and to write data to the magnetic disk using a magnetic head comprising a controller configured to control an initial operation of the magnetic disk device according to initial firmware, the control method comprising:

reading control firmware in the magnetic disk under control of the initial firmware;

fixing an amount of servo control for the magnetic head after the control firmware is read, and positioning the magnetic head at a predetermined position above the magnetic disk; and switching the initial firmware to the control firmware after the magnetic head is positioned at the predetermined position above the magnetic disk without retracting the magnetic head.

2. The control method of claim 1, further comprising:

blocking an interrupt process to a control according to the initial firmware, and switching the initial firmware to the control firmware after the interrupt process is blocked.

3. The control method of claim 1, wherein the predetermined position is in a predetermined range comprising a middle circumference of the magnetic disk.

* * * * *